US007617335B2

(12) United States Patent
Choi

(10) Patent No.: US 7,617,335 B2
(45) Date of Patent: Nov. 10, 2009

(54) SYSTEM HAVING INSERTABLE AND REMOVABLE STORAGE AND A CONTROL METHOD THEREOF

(75) Inventor: Soo-Hwan Choi, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 547 days.

(21) Appl. No.: 10/932,482

(22) Filed: Sep. 1, 2004

(65) Prior Publication Data

US 2005/0050235 A1 Mar. 3, 2005

(30) Foreign Application Priority Data

Sep. 2, 2003 (KR) .................... 10-2003-0061089

(51) Int. Cl.
*G06F 3/00* (2006.01)
(52) U.S. Cl. .............................................. 710/8; 710/5
(58) Field of Classification Search ................ 710/8, 710/5
See application file for complete search history.

(56) References Cited

U.S. PATENT DOCUMENTS

| 5,534,711 | A  | * | 7/1996 | Ovshinsky et al. ............ 257/3 |
| 5,689,460 | A  |   | 11/1997 | Ooishi |
| 6,191,994 | B1 | * | 2/2001 | Ooishi ........................ 365/226 |
| 6,327,663 | B2 | * | 12/2001 | Isaac et al. .................. 713/300 |
| 6,378,018 | B1 |   | 4/2002 | Tsern et al. |
| 6,856,556 | B1 | * | 2/2005 | Hajeck ..................... 365/189.11 |
| 2001/0038547 | A1 | * | 11/2001 | Jigour et al. ................... 365/43 |
| 2002/0056063 | A1 |   | 5/2002 | Nerl |
| 2002/0118001 | A1 | * | 8/2002 | Duffy et al. ................. 323/283 |
| 2002/0176279 | A1 | * | 11/2002 | Kwon ..................... 365/185.18 |

FOREIGN PATENT DOCUMENTS

| JP | 2001-035199 | 2/2001 |
| KR | 1999-0084397 | 12/1999 |
| KR | 2000-0017272 | 3/2000 |
| WO | WO 01/42929 A | 6/2001 |
| WO | WO 01/75890 A2 | 10/2001 |
| WO | WO 01/75890 A3 | 10/2001 |

\* cited by examiner

*Primary Examiner*—Henry W. H. Tsai
*Assistant Examiner*—John B Roche
(74) *Attorney, Agent, or Firm*—Marger Johnson & McCollom, P.C.

(57) ABSTRACT

A system including a host and a subsystem operatively coupled to the host and having a flash memory is provided. The host reads device information from a memory and provides a predetermined command to the subsystem that changes the multi-source mode to a host mode responsive to the device information. A method for controlling a subsystem and a host is additionally provided. The method includes reading device information from a memory on the subsystem and determining whether the subsystem operates in a multi-source mode responsive to the device information. The method provides a predetermined command to the subsystem so as to change the multi-source mode to a host mode responsive to the determining.

12 Claims, 6 Drawing Sheets

SYSTEM HAVING INSERTABLE AND REMOVABLE STORAGE AND A CONTROL METHOD THEREOF

PRIORITY INFORMATION

This application claims priority from Korean patent application No. 2003-61089, filed Sep. 2, 2003, which we incorporate by reference.

BACKGROUND

1. Field of the Invention

The present invention relates to an electronic device and, more particularly, to a system having insertable and removable storage and a control method thereof.

2. Description of the Related Art

Electronic devices, especially, portable electronic devices require a low operation voltage to avoid excess heat emission and power consumption. Consumers often desire these devices to be capable of performing many functions that need different amounts of memory. E.g., further to an inherent call function, many portable telephones have a camera function for photographing still images and a camcorder function for photographing mobile images. To smoothly process additional functions together with the inherent functions, the electronic device requires more memory than needed to accomplish simply the call function. Upgradeable flash memory has become a common solution.

As well known, a memory suitable to the portable electronic device is a NAND flash memory. NAND flash memory is packed into an insertable and removable card. Such a card can be inserted into or removed from the portable electronic device according to a user's needs. E.g., a card such as a Multi Media Card (MMC), a Secure Digital card (SD card), a smart media card, or a compact flash card is used to store data for many devices including digital cameras, MP3 players, Portable Digital Assistants (PDAs), handheld personal computers, game players, facsimile machines, scanners, printers, and the like.

As a result, the insertable and removable card must function in many different environments. E.g., the insertable and removable card may be used in an electronic device operating at 3.3V. Alternatively, the insertable and removable card may be used in another electronic device operating at 1.8V. When the card operating at 3.3V is used for the portable electronic device operating at a lower operation voltage, it is impossible to guarantee proper functionality.

Embodiments of the invention address these and other limitations in the prior art.

SUMMARY

An embodiment of the present invention is directed to a system having insertable and removable storage and a control method thereof that addresses the disadvantages associated with prior storage solutions.

An embodiment of the present invention provides a system having insertable and removable storage that operates normally regardless of operation voltage, and a control method thereof.

An embodiment of the present invention includes a method for controlling a system having a subsystem with a flash memory, and a host for controlling the subsystem, the method comprising: reading device information from a memory of the subsystem at power-up; determining whether or not the subsystem is in a multi-source mode, depending on the read device information; and introducing a predetermined command into the subsystem to change the multi-source mode of the subsystem correspondingly to an operation characteristic of the host when the subsystem has the multi-source mode.

The subsystem may be operated at a first voltage and a second voltage lower than the first voltage.

The host may not output the predetermined command to the subsystem at the power-up when the subsystem operates at the first voltage.

The host may output the predetermined command to the subsystem at the power-up when the subsystem operates at the second voltage.

The flash memory of the subsystem may include a NAND flash memory.

The flash memory may include a control circuit to generate a control signal responsive to the predetermined command and an internal supply-voltage generation circuit to convert an external supply voltage into an internal supply voltage where the internal supply-voltage generation circuit outputs the internal supply voltage having the same voltage level as the external supply voltage responsive to the control signal.

An embodiment of the present invention includes a system comprising a host and a subsystem having a flash memory, where the host reads device information from a memory at power-up, and determines whether or not the subsystem is in a multi-source mode responsive to the read device information, and a predetermined command is introduced into the subsystem to change the multi-source mode of the subsystem correspondingly to an operation characteristic of the host when the subsystem has the multi-source mode.

The flash memory may include a control circuit to generate a control signal responsive to the predetermined command and an internal supply-voltage generation circuit to convert an external supply voltage into an internal supply voltage, where the internal supply-voltage generation circuit outputs the internal supply voltage having the same voltage level as the external supply voltage, responsive to the control signal.

The internal supply-voltage generation circuit may include a PMOS transistor connected between the external supply voltage and the internal supply voltage, a comparator to control the PMOS transistor depending on whether or not the internal supply voltage is higher than a reference voltage, and an NMOS transistor connected between a gate of the PMOS transistor and a ground voltage, and controlled by the control signal.

The following description of embodiments of the present invention are exemplary and intended to provide a detailed description without necessarily limiting the claimed invention.

BRIEF DRAWING DESCRIPTION

The accompanying drawings are included to provide an understanding of the invention. The drawings are incorporated in and constitute a part of this application. The drawings illustrate embodiment(s) of the invention and together with the description are exemplary of the invention.

DETAILED DESCRIPTION OF THE INVENTION

Reference will now be made in detail to the embodiments of the present invention, examples of which are illustrated in the accompanying drawings. The present invention is not limited to the embodiments illustrated here. The embodiments are rather introduced to provide easy and complete understanding of the scope and spirit of the present invention.

In this specification, an insertable and removable storage may include a card having a NAND flash memory. The terms "insertable and removable storage," "insertable and removable card," "insertable and removable memory card," "memory card," and "memory stick" are used interchangeably and alternatively.

Figure 1:
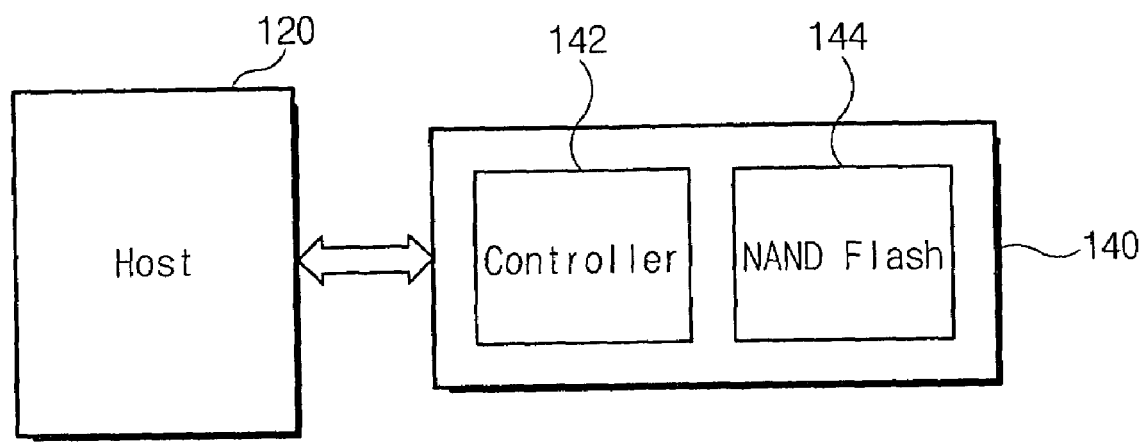
FIG. 1 is a schematic block diagram of a system according to an embodiment of the present invention.

FIG. 1 is a schematic block diagram of a system according to a preferred embodiment of the present invention. The system 100 includes an electronic device, e.g., a digital camera, an MP3 player, a Portable Digital Assistant (PDA), a handheld personal computer, a handheld game player, and a handheld facsimile machine. The system 100 includes a host 120 and a subsystem 140, e.g., insertable and removable storage. The host 120 supplies an operation voltage to the subsystem 140, and stores or reads data in or from the subsystem 140, respectively. The subsystem 140 includes a controller 142 and a NAND flash memory 144. The controller 142 controls an operation of the NAND flash memory 144 responsive to a command transmitted from the host 120. As well known in the art, a variety of data (e.g., a maker code, a device code, and the like) is stored in the NAND flash memory 144.

When the subsystem 140 is connected with the host 120, the host 120 determines the operating environment of the subsystem 140 (e.g., an operation voltage). The host 120 controls the subsystem 140 so as to operate adaptively to the determined operation environment of the host 120. E.g., when the subsystem 140 operates at only one operation voltage (e.g., 1.8V or 3.3V), the host 120 controls the subsystem 120 such that well-known read/write operations are performed without a separate control process. Alternatively, when the subsystem 140 operates at different operation voltages (e.g., 1.8V and 3.3V) or when the subsystem 140 operates in a dual-source mode (one skilled in the art would recognize that in other embodiments the subsystem could operate in a multi-source mode), the host 120 controls the operation environment of the subsystem 140 in a predetermined control process to put the subsystem in the same mode as the host (host mode). Depending on the control process, the subsystem 140 can be used regardless of the operation voltage (e.g., 3.3V and 1.8V) of the system 100 (or the host 120). In this embodiment, voltage is one example of a host mode. We describe this process below.

Figure 2:
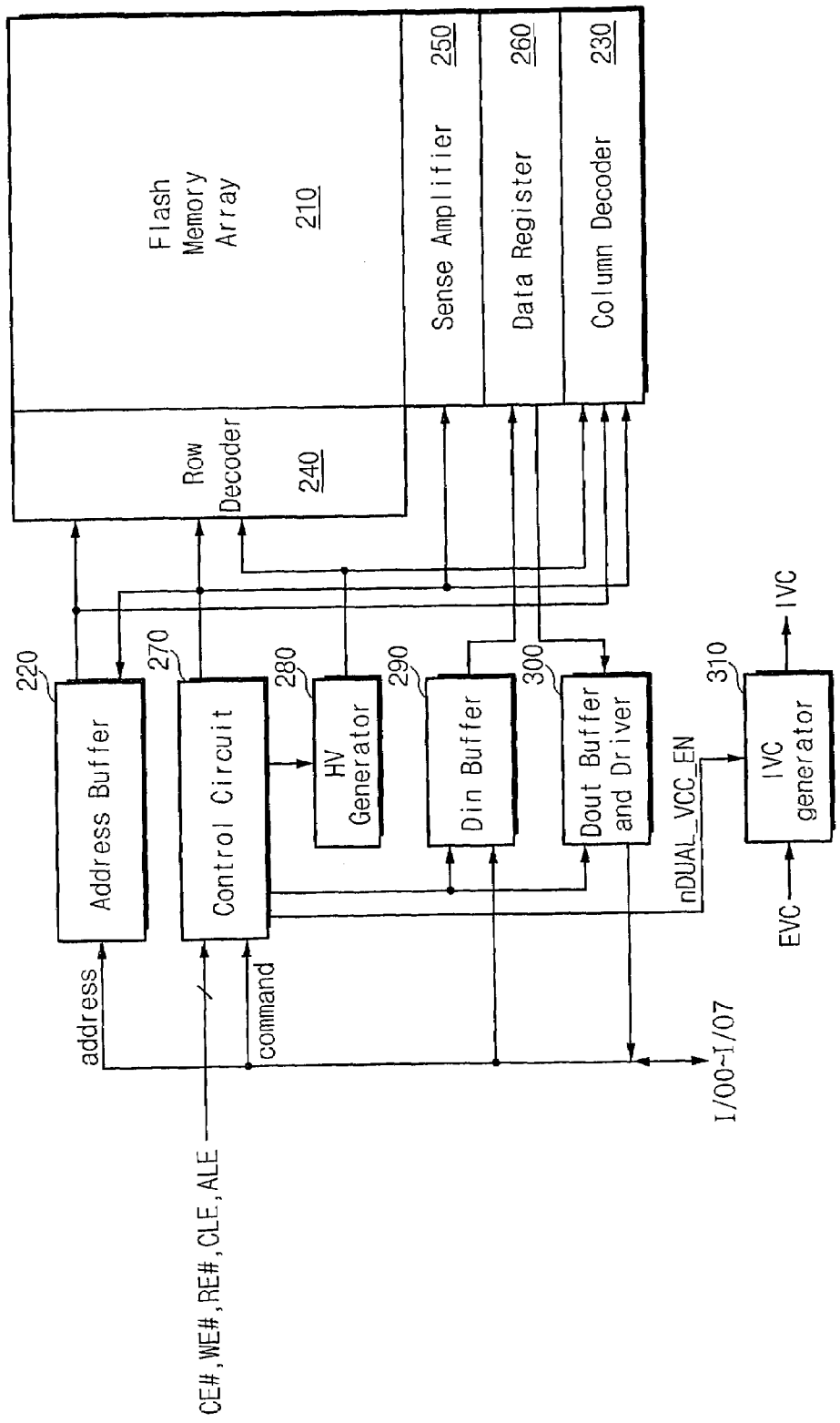
FIG. 2 is a schematic block diagram of a NAND flash memory of FIG. 1 according to an embodiment of the present invention.

FIG. 2 is a schematic block diagram of the NAND flash memory of FIG. 1 according to an embodiment of the present invention. Referring to FIG. 2, the inventive NAND flash memory 144 includes a memory cell array 210 for storing data. The memory cell array 210 includes NAND cells or cell strings. As well-known in the art, a NAND string includes a string select transistor connected to a bit line, a ground select transistor connected to a common source line, and memory cell transistors series-connected between the select transistors. The memory cell transistors are respectively controlled by corresponding word lines. An address buffer circuit 220 latches row and column addresses, which are provided for input/output pins (I00-I0n), according to the control of the control circuit 270. The latched row and column addresses are transmitted to a row decoder circuit 230 and a column decoder circuit 240, respectively. The row decoder circuit 240 selects one of the word lines responsive to the inputted address to supply word line voltages to the selected word line and the non-selected word lines. During the read operation, a read voltage is supplied to the selected word line and a pass voltage is supplied to each of the non-selected word lines. During the program operation, a program voltage is supplied to the selected word line and the pass voltage is supplied to each of the non-selected word lines. As with word line voltages, the high-voltage generation circuit 280 generates the read voltage, the pass voltage and the program voltage responsive to the control of the control circuit 270. The high-voltage generation circuit 280 may be a well-known pump circuit.

A sense amplification circuit 250 may be a page buffer circuit that performs various functions according to an operation mode. During the read operation, the sense amplification circuit 250 reads data from the memory cells of the selected word line. During the program operation, the sense amplification circuit 250 supplies the program voltage or a program inhibition voltage to the respective bit lines depending on states of data to be programmed. During the program operation, data to be programmed into the memory cells is temporarily stored in a data register 260. A data input buffer circuit 290 receives the data to be programmed into the memory cells, through the input/output pins I00-I0n, and transmits the inputted data to the data register 260. A data output buffer and drive circuit 300 drives the input/output pins I00-I0n depending on data outputted from the data register 260. The data input buffer circuit 290 and the data output buffer and drive circuit 300 operate under the control of the control circuit 270.

The control circuit 270 operates responsive to control signals CE#, WE#, RE#, CLE and ALE. The control circuit 270 controls the program/read/erase operation depending on a command provided through the input/output pins I00-I0n. The control circuit 270 enables a control signal nDUAL_VCC_EN when the host 120 (FIG. 1) provides a predetermined command (e.g., a voltage set command) for setting the operation voltage. The control signal nDUAL_VCC_EN indicates the NAND flash memory 144 operates at any operation voltage. When the control signal nDUAL_VCC_EN is disabled, the NAND flash memory 144 may use the operation voltage of 3.3V to perform the read/write operation. When the control signal nDUAL_VCC_EN is enabled, on the other hand, the NAND flash memory 144 may use the operation voltage of 1.8V to perform the read/write operation.

The internal supply-voltage generation circuit 310 receives an external supply voltage EVC to generate an internal supply voltage IVC. As is well known, the internal supply voltage IVC obtained by dropping the external supply voltage EVC in consideration of an operation voltage variation and a noise characteristic is used to guarantee a constant operation characteristic. Generally, the internal supply-voltage generation circuit 310 is designed under a precondition where the external supply voltage EVC is higher than a predetermined internal supply voltage. For this reason, it is difficult to secure the operation characteristic of the NAND flash memory 144 if the external supply voltage EVC is lower than the predetermined internal supply voltage. For example, a 3.3V host requires a subsystem that operates at an operation characteristic of 3.3V±10%. Similarly, a 1.8V host requires a subsystem that operates at an operation characteristic of 1.8V±5%. For this reason, the internal supply-voltage generation circuit 310 lowers the external supply voltage EVC responsive to the control signal nDUAL_VCC_EN. The internal supply-voltage generation circuit 310 outputs the external supply voltage EVC as the internal supply voltage IVC without a voltage drop responsive to the control signal nDUAL_VCC_EN.

Figure 3:
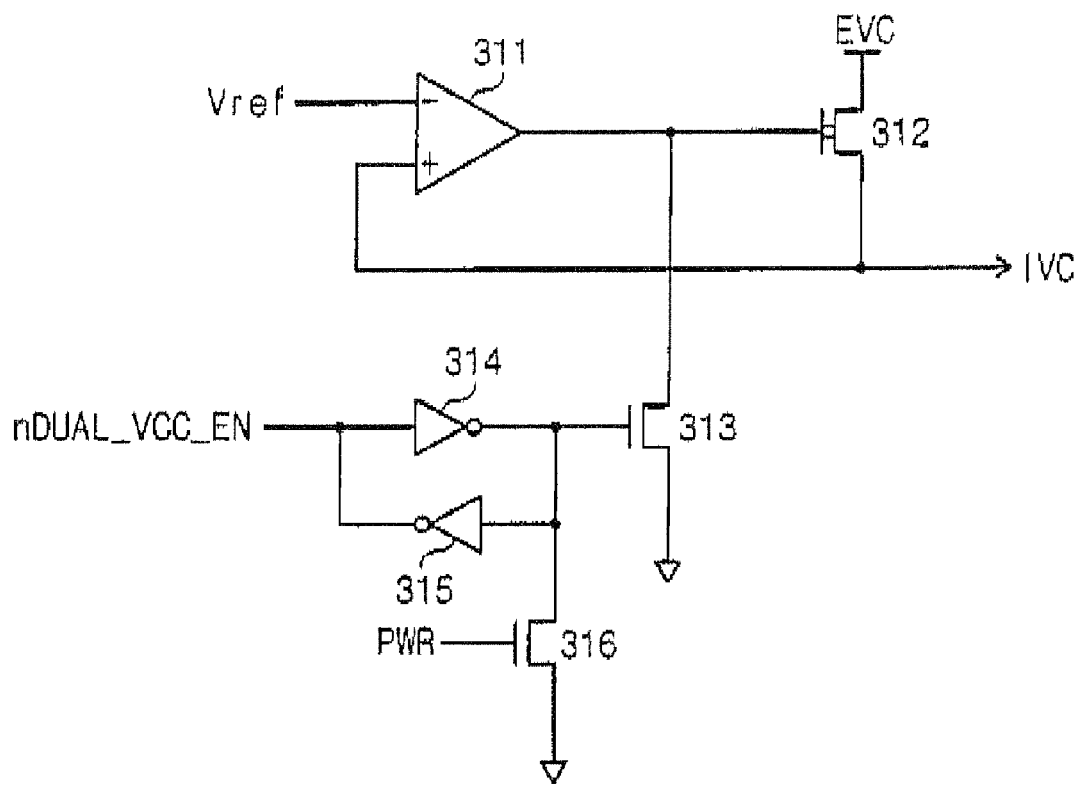
FIG. 3 is a circuit diagram of the internal supply-voltage generation circuit of FIG. 2 according to an embodiment of the present invention.

FIG. 3 is a circuit diagram of an internal supply-voltage generation circuit of FIG. 2 according to an embodiment of the present invention. Referring to FIG. 3, the internal supply-voltage generation circuit 310 includes a comparator 311, a PMOS transistor 312, NMOS transistors 313 and 316, and inverters 314 and 315. The comparator 311 has an inversion input terminal (−) to receive a reference voltage Vref. And the comparator 311 has a non-inversion input terminal (+) to receive the internal supply voltage IVC. The PMOS transistor 312 is connected between the external supply voltage EVC and the internal supply voltage IVC, and is controlled by an output signal of the comparator 311. The NMOS transistor 313 is connected between a gate of the PMOS transistor 312 and a ground voltage, and is controlled by the control signal nDUAL_VCC_EN transmitted through the inverter 314. The inverter 315 is connected with the inverter 314 to construct a latch. The NMOS transistor 316 is connected between a gate of the NMOS transistor 313 and the ground voltage, and is controlled by a control signal PWR. The control signal PWR is generated by a power-up detection circuit (not shown), and is enabled at power-up.

Assuming the control signal nDUAL_VCC_EN is disabled, the NMOS transistor 313 is turned off. Under this condition, the comparator 311 determines whether the internal supply voltage IVC is higher than the reference voltage Vref. If so, the PMOS transistor 312 is turned off by the output signal of the comparator 311. At this time, the internal supply voltage IVC is disconnected from the external supply voltage EVC. This causes the internal supply voltage IVC to be lowered. If, on the other hand, the internal supply voltage IVC is lower than the reference voltage Vref, the comparator 311 outputs an approximate ground voltage, to turn on the PMOS transistor 312. In this case, the internal supply voltage IVC is connected to the external supply voltage EVC and as a result, the internal supply voltage IVC rises to reach the external supply voltage EVC. The above-described operation will be repetitively performed depending on a variation of the internal supply voltage IVC.

If an external supply voltage EVC lower than the predetermined internal supply voltage IVC is applied when the control signal nDUAL_13_VCC_13_EN is disabled, the comparator 311 outputs a signal that approximates but is not identical with a ground voltage (that is, the voltage level approximates a threshold voltage (about 0.7V) of the NMOS transistor). Accordingly, the PMOS transistor 312 is not fully turned on and as a result, the internal supply voltage IVC is not identical with the external supply voltage EVC. The internal supply voltage IVC may be lower than the external supply voltage EVC by 0.1V or so. This deteriorates the low voltage characteristic of the subsystem 140 or the NAND flash memory.

Referring to FIG. 3, where the control signal nDUAL_VCC_EN is enabled, the NMOS transistor 313 is turned on. In this case, the PMOS transistor 312 has the gate connected to the ground voltage through the NMOS transistor 313 irrespective of the operation of the comparator 311, and the PMOS transistor 312 is fully turned on. Accordingly, the external supply voltage EVC is transmitted to the internal supply voltage IVC without the voltage drop of the PMOS transistor. That is, the internal supply voltage IVC is identical with the external supply voltage EVC. Accordingly, this means that the low voltage characteristic of the subsystem 140 or the NAND flash memory 144 is satisfactory.

Figure 4:
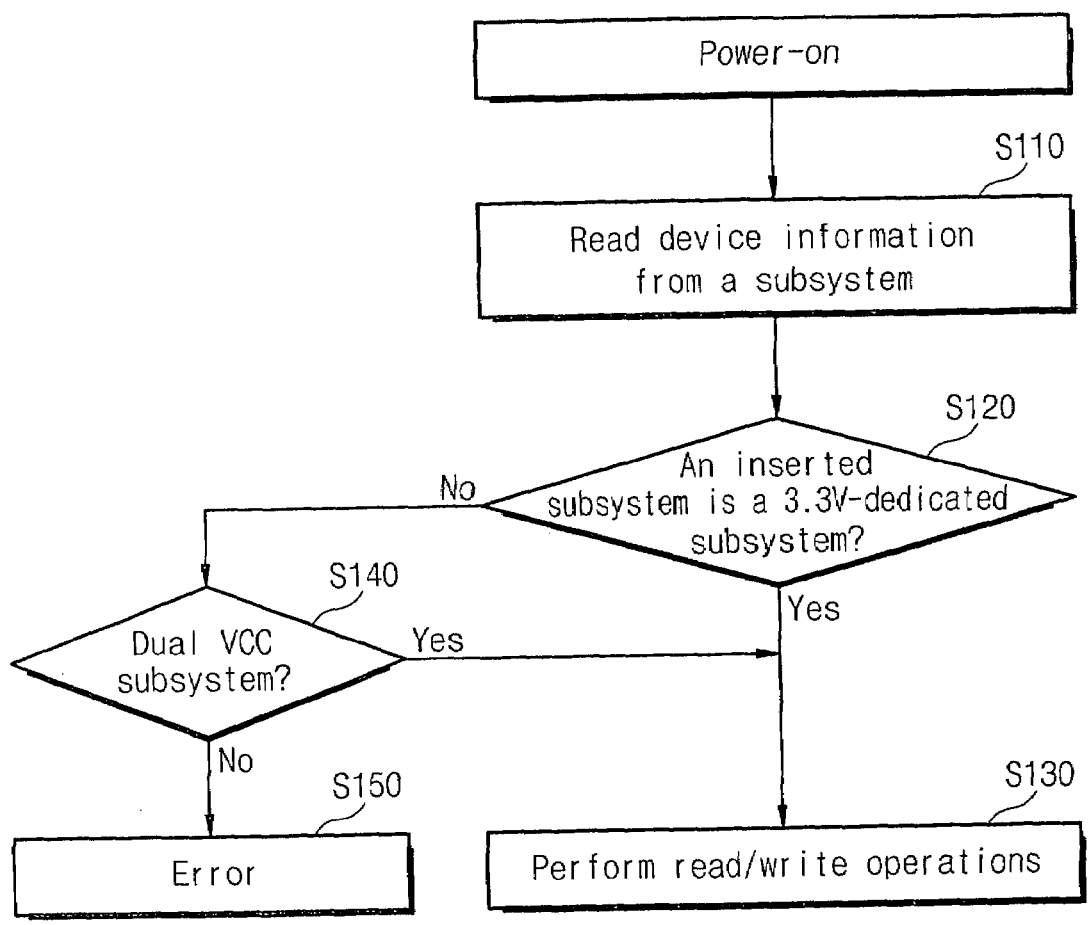
FIG. 4 is a flowchart of a method for operating a host at 3.3V.
Figure 5:
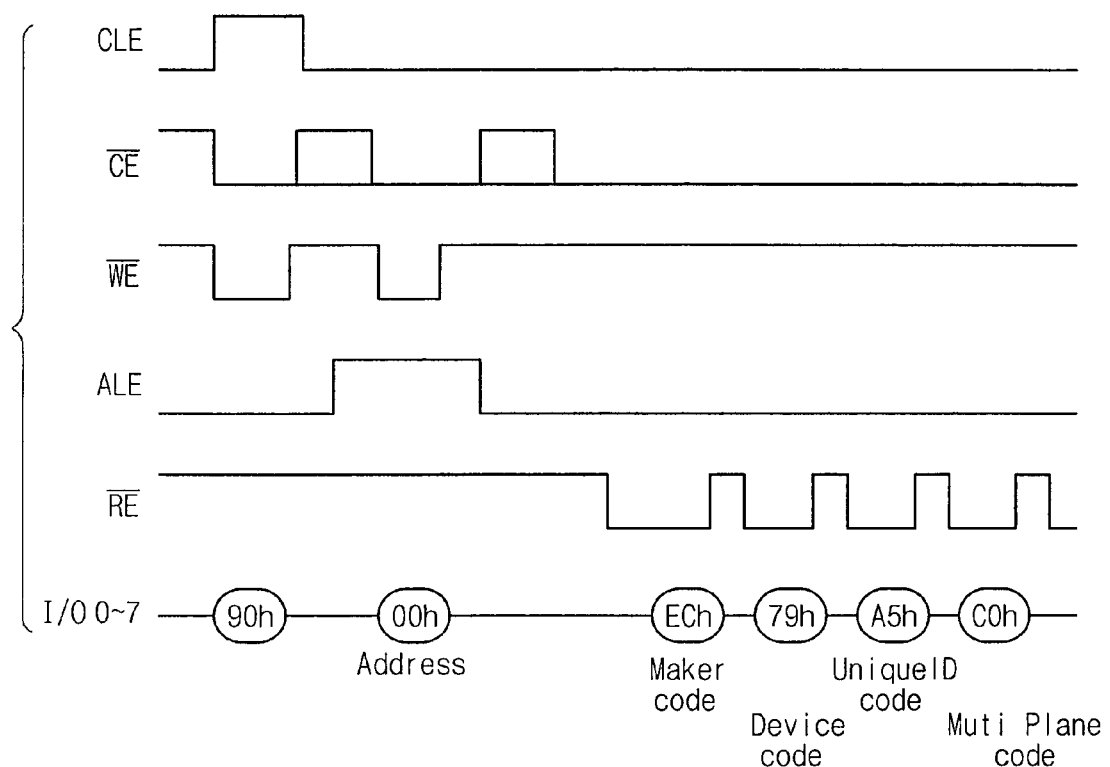
FIG. 5 is a timing diagram of a NAND flash memory according to a preferred embodiment of the present invention.

FIG. 4 is a flowchart of a method for controlling a host operating at 3.3V. FIG. 5 is a timing diagram of a NAND flash memory according to an embodiment of the present invention. Referring to FIGS. 1, 4, and 5, the host 120 operates at e.g., 3.3V. When the operation supply source is supplied when the subsystem 140 is connected with the host 120, the host 120 reads the device information from the NAND flash memory 144 of the subsystem 140 (S110). That is, if the NAND flash memory 144 receives a command and an address of a 90h according to predetermined timing, the NAND flash memory 144 outputs data (e.g., maker code, device code, unique ID code, multi plane code) stored in an input address. The data is transmitted to the host 120 through the controller 142.

The device information may include information on whether the NAND flash memory 144 operates at 3.3V or 1.8V, or whether it operates at either 3.3V or 1.8V.

The host 120 determines whether the subsystem 140 is a subsystem operating only at 3.3V depending on the read device information (S120). If the subsystem 140 operates only at 3.3V, the host 120 controls the subsystem 140 to allow the NAND flash memory 144 to perform the read and write operations in a well known manner (S130). If the subsystem 140 does not operate only at 3.3V, the host 120 determines whether the NAND flash memory 144 is operates at either 3.3V or 1.8V (S140). If the subsystem 140 operates at either 3.3V or 1.8V, the host 120 controls the subsystem to allow the NAND flash memory 144 to perform the read and write operations in the well known manner (S130). If the subsystem 140 does not operate at either 3.3V or 1.8V, the host 120 performs predetermined error-processing (S150).

When the subsystem 140 operates at either 3.3V or 1.8V and is connected with the 3.3V host 120, the host 120 does not output the voltage set command to the subsystem 140 before normal read and write operations. Accordingly, the NAND flash memory 144 of the subsystem 140 operates adaptively at 3.3V. That is, since the control signal nDUAL_VCC_EN is disabled, the NMOS transistor 313 of the internal supply-voltage generation circuit 310 is turned off. Accordingly, the internal supply-voltage generation circuit 310 generates the internal supply voltage IVC that is obtained by dropping the external supply voltage EVC through the comparator 311 and the PMOS transistor 312.

Figure 6:
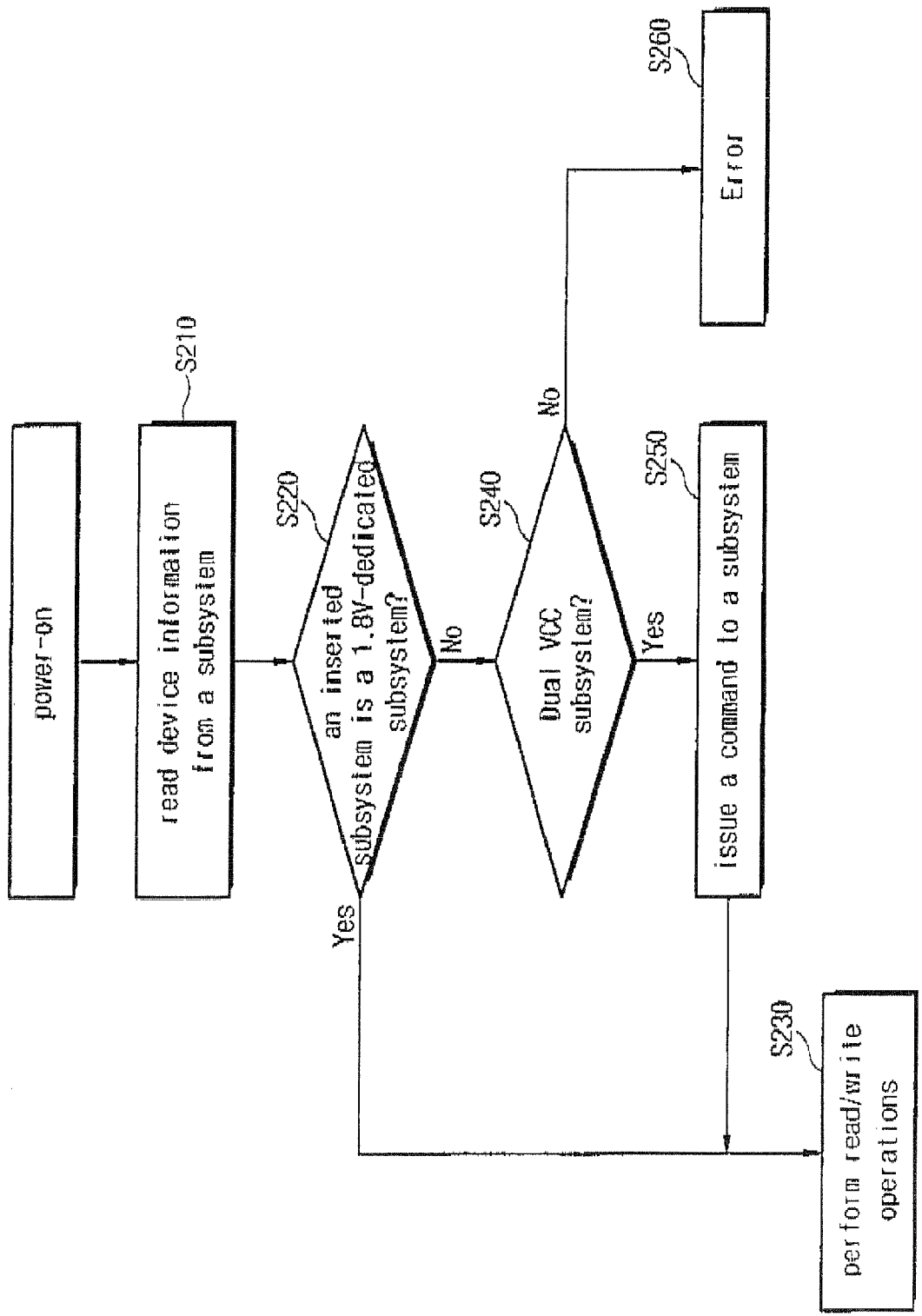
FIG. 6 is a flowchart of a method for operating a host at 1.8V.

FIG. 6 is a flowchart of a method for controlling the host operating at 1.8V. Referring to FIGS. 1 and 6, the host 120 operates at 1.8V. When the operation supply source is supplied when the subsystem 140 is connected with the host 120, the host 120 reads the device information from the NAND flash memory 144 (S210). As we describe above, the device information may include information on whether the NAND flash memory 144 operates only at 3.3V, 1.8V, or both. The host 120 determines whether the subsystem 140 is the subsystem operating only at 1.8V depending on the read device information (S220). If the subsystem 140 operates only at 1.8V, the host 120 controls the subsystem 140 to allow the NAND flash memory 144 to perform the read and write operations in the well known manner (S230).

If the subsystem 140 does not operate only at 1.8V, the host 120 determines whether the NAND flash memory 144 operates at either 3.3V or 1.8V (S240). If the subsystem 140 operates at either 3.3V or 1.8V, the host 120 outputs a predetermined voltage set command according to predetermined timing (S250). The voltage set command is transmitted to the NAND flash memory 144 through a controller 142, and the control circuit 270 of the NAND flash memory enables the control signal nDUAL_13_VCC_EN responsive to the voltage set command. When the control signal nDUAL_VCC_EN is enabled, the NMOS transistor 313 is turned on. In this case, the PMOS transistor 312 has the gate connected to the ground voltage through the NMOS transistor 313 regardless of the comparator 311, and the PMOS transistor 312 is fully turned on. Accordingly, the external supply voltage EVC is transmitted to the internal supply voltage IVC without the voltage drop of the PMOS transistor 312. That is, the internal supply voltage IVC is identical with the external supply voltage EVC.

The host 120 controls the subsystem 140 to allow the NAND flash memory 144 to perform the read and write operations in the well known manner (S230). If the subsystem 140 does not operate at either 3.3V or 1.8V, the host 120 performs the predetermined error-processing (S260).

As understood from the above description, when the subsystem 140 that operates at either 3.3V or 1.8V is connected with the 1.8V host 120, the host 120 outputs the voltage set command to the subsystem 140 before the normal read and write operations. Accordingly, the NAND flash memory 144 of the subsystem 140 operates adaptively at 1.8V. That is, since the control signal nDUAL_VCC_EN is enabled, the NMOS transistor 313 of the internal supply-voltage generation circuit 310 is turned on such that the gate of the PMOS transistor 312 is grounded. Accordingly, the internal supply-voltage generation circuit 310 outputs the external supply voltage EVC as the internal supply voltage IVC without the voltage drop.

Though not shown in the drawings, but when the NAND flash memory 144 operates only at 1.8V, the external supply voltage EVC is used as the internal supply voltage IVC without the internal supply-voltage generation circuit. Or the external supply voltage EVC is used as the internal supply voltage IVC through the well known internal supply-voltage generation circuit. Further, the subsystem 140 may include a NAND flash memory 144 without a controller for controlling memory functions.

It should be obvious to a person of reasonable skill in the art the present invention applies equally to the subsystem. An embodiment may change a supply source mode in a command way. An embodiment includes replacing storing the device information in the memory with providing the device information using a logic circuit.

As described above, when the NAND flash memory 144 of the subsystem 140 is connected with the host 120 using the external supply voltage EVC lower than the predetermined internal supply voltage IVC, the internal supply voltage IVC is lower than the external supply voltage EVC by about 0.05V to 0.1V. This appears as the reduction of a low VCC margin of the NAND flash memory. However, in the inventive system, when the NAND flash memory 144 is connected with the host 120 using the external supply voltage EVC lower than the predetermined internal supply voltage IVC, the host 120 applies the voltage set command to the subsystem 140 and as a result, a gate voltage of the PMOS transistor 312 is grounded through the NMOS transistor 313. As a result, since the internal supply voltage IVC has the same voltage level as the external supply voltage EVC, it is possible to secure the operation characteristic of the NAND flash memory 144 of the subsystem 140 for the low supply voltage.

It will be apparent to those skilled in the art that various modifications and variations can be made in the present invention. The present invention covers all modifications and variations that come within the scope of the appended claims and their equivalents.

I claim:

1. A method for controlling a flash memory subsystem and a host, comprising:
   reading device information including operation voltages of the flash memory subsystem from a memory of the flash memory subsystem;
   determining whether the flash memory subsystem operates at one of (a) only a first voltage and (b) both the first voltage and a second voltage lower than the first voltage responsive to the device information;
   providing a predetermined voltage set command to the flash memory subsystem responsive to the determining;
   generating a control signal in the flash memory subsystem responsive to the predetermined voltage set command received from the host, the control signal to indicate whether to operate the flash memory subsystem at the first voltage; and
   converting an external supply voltage of the host into an internal supply voltage of the flash memory subsystem when the host is operated at the second voltage and the control signal indicates that the flash memory subsystem operates at both the first voltage and the second voltage.

2. The control method of claim 1 comprising operating the flash memory subsystem at the external supply voltage of the host without a voltage drop responsive to the providing, wherein providing includes transmitting the predetermined voltage set command from the host to the flash memory system responsive to the determining.

3. The control method of claim 1 where reading includes reading from a NAND flash memory.

4. The control method of claim 1 where the internal supply voltage has approximately the same level as the external supply voltage responsive to the control signal.

5. A system comprising:
   a host; and
   a subsystem operatively coupled to the host, operating in a multi source mode being operated at a first voltage or a second voltage lower than the first voltage, and having a memory;
   where the host reads device information including operation voltages of the subsystem from the memory;
   where the host provides a predetermined command to the subsystem that changes the multi-source mode to a host mode when the host is operated at the second voltage and the device information indicates that the subsystem operates at both the first voltage and the second voltage; and
   where the subsystem comprises:
      a control circuit to generate a control signal responsive to the predetermined command; and
      an internal supply-voltage generation circuit to convert an external supply voltage into an internal supply voltage responsive to the control signal.

6. The system of claim 5 where the subsystem operates at the second voltage responsive to the predetermined command.

7. The system of claim 5 where the subsystem comprises a NAND flash memory.

8. The system of claim 5 where the internal supply-voltage generation circuit outputs the external supply voltage as the internal supply voltage without a voltage drop responsive to the control signal.

9. The system of claim 8 where the internal supply-voltage generation circuit comprises:
   a PMOS transistor coupled between the external supply voltage and the internal supply voltage;

a comparator operatively coupled to the PMOS transistor, the comparator comparing the internal supply voltage to a reference voltage, the PMOS transistor being controlled by the comparator; and an NMOS transistor directly coupled between a gate of the PMOS transistor and a ground voltage, and controlled by the control signal.

10. The system of claim 9, where when the internal supply voltage is higher than the reference voltage, the internal supply voltage is configured to be decoupled from the external supply voltage.

11. The system of claim 9, where when the internal supply voltage is lower than the reference voltage, the internal supply voltage is coupled to the external supply voltage and rises to a level of the external supply voltage.

12. The system of claim 9, where the control signal is configured to turn on the NMOS transistor, the gate of the PMOS transistor, which is coupled to an output of the comparator, is configured to receive the ground voltage via the NMOS transistor, and the PMOS transistor is configured to transmit the external supply voltage to the internal supply voltage irrespective of an operation of the comparator.

* * * * *